Sept. 14, 1954     V. A. RAYBURN     2,688,768
APPARATUS FOR CONTINUOUSLY MAKING
PLASTIC-CONTAINING ARTICLES
Filed Dec. 6, 1950
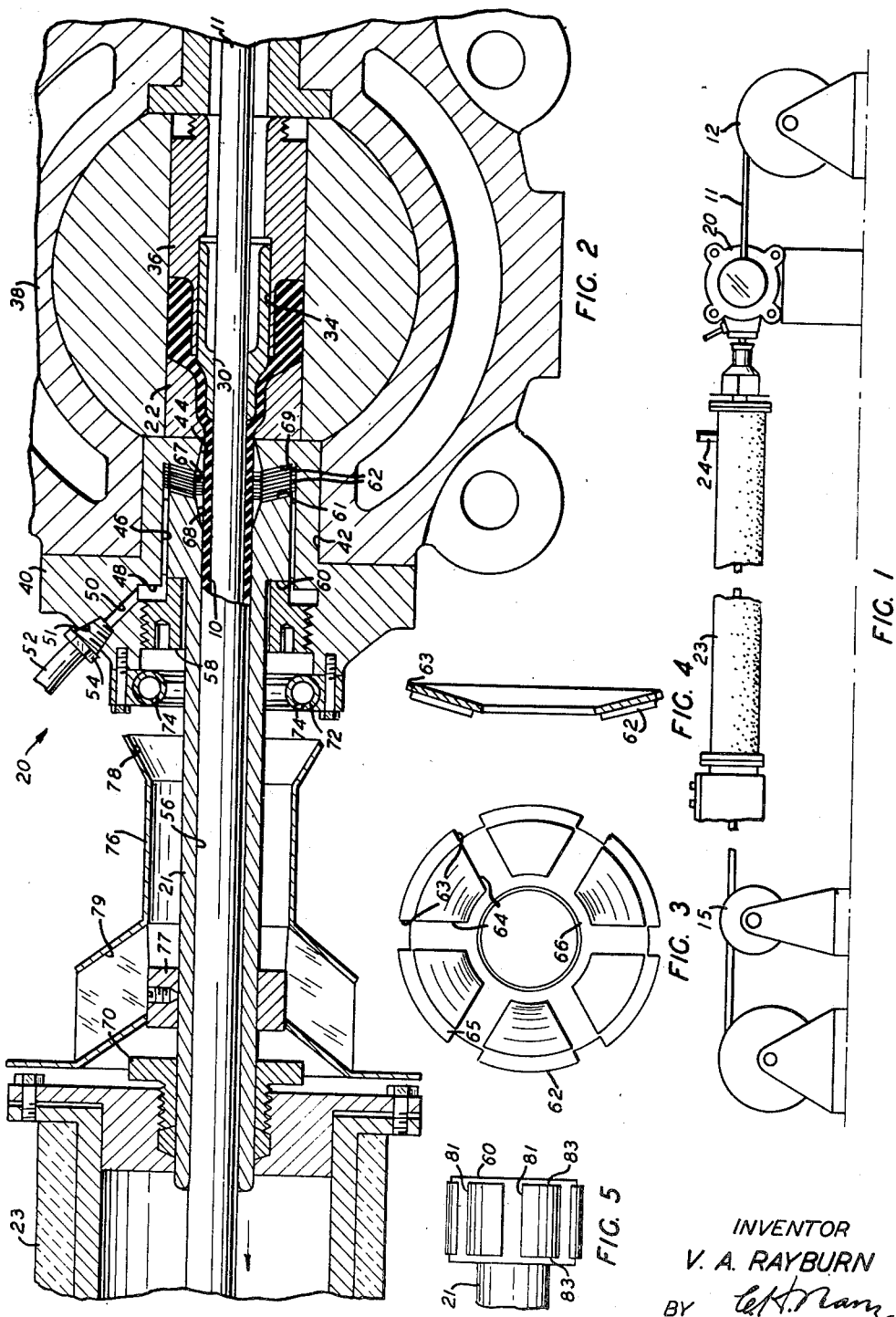
INVENTOR
V. A. RAYBURN
BY
ATTORNEY Patented Sept. 14, 1954

2,688,768

UNITED STATES PATENT OFFICE 2,688,768

APPARATUS FOR CONTINUOUSLY MAKING PLASTIC-CONTAINING ARTICLES

Vincent A. Rayburn, Baltimore, Md., assignor to Western Electric Company, Incorporated, New York, N. Y., a corporation of New York Application December 6, 1950, Serial No. 199,467

4 Claims. (Cl. 18—6)

1

This invention relates to apparatus for continuously making plastic-containing articles, and particularly to apparatus for making jacketed cables.

In some processes used in the past, elongated filamentary articles have been continuously covered by extruded layers of vulcanizable compounds, which are then vulcanized continuously by drawing the covered articles through long vulcanizing tubes containing live steam. In order to increase the output of such apparatus, the vulcanizing tube employed sometimes is made as long as several hundred feet to permit the covering to be extruded and the covered article to be advanced at very rapid rates and still remain in the vulcanizing tube a sufficient period of time for complete vulcanization of the covering.

The freshly extruded covering is soft and plastic in about the first half of the vulcanizing tube, but is comparatively tough at the exit end of the vulcanizing tube. Heretofore, it has been difficult to extrude and continuously vulcanize a covering on a relatively heavy article at a high rate of speed without damaging the article because the article sags due to its weight and slides along the bottom of the vulcanizing tube for the greater part of the length of the vulcanizing tube. As a result, the soft covering thereof sometimes is scuffed as it is dragged along the bottom of the vulcanizing tube, and the finished product may be unacceptable.

An object of the invention is to provide new and improved apparatus for continuously making plastic-containing articles.

An additional object of the invention is to provide new and improved apparatus for making jacketed cables without scuffing the jacket thereof.

Another object of the invention is to provide non-clogging lubricators for continuous extrusion and vulcanization apparatus including heated tubes contacting vulcanizable coverings to toughen the outer portions of the coverings.

A further object of the invention is to provide non-clogging lubricators for tubes contacting plastic coverings to smooth the outer portions of the coverings.

An apparatus illustrating certain features of the invention may include an extruder for forming at least a plastic covering of a filament, means for advancing the filament continuously from the extruder in a predetermined direction, a tube which surrounds the covered filament adjacent to the extruder and means directed at least partially in the direction of movement of the filament for injecting a lubricant into the tube.

2

A complete understanding of the invention may be obtained from the following detailed description of an apparatus forming a specific embodiment thereof, when read in conjunction with the appended drawings, in which:

Fig. 1 is a fragmentary, side elevation of an apparatus forming one embodiment of the invention;

Fig. 2 is an enlarged, fragmentary vertical section of the apparatus;

Fig. 3 is an enlarged, perspective view of a laminate forming a portion of the apparatus shown in Fig. 1;

Fig. 4 is a vertical section of the laminate, and

Fig. 5 is a fragmentary elevation of a skin-curing tube employed in the apparatus.

Referring now in detail to the drawings, there is shown therein a continuous extruding and vulcanizing machine for forming and vulcanizing a protective jacket 10 (Fig. 2) around a heavy cable core 11 (Fig. 1) of substantial length to form a covered cable. In forming the jacket on the cable core 11, the core is advanced continuously from a supply reel 12 by a capstan 15, through an extruder 20, which extrudes thereon the jacket of a vulcanizable compound, such as a rubber compound, a polymerized chloroprene compound or a compound including a copolymer of butadiene and styrene.

The covered cable is advanced from the extruder through a close-fitting, skin-curing tube 21, which is spaced closely to a die 22, and then into an elongated, steam-jacketed vulcanizing tube 23. The tube 21 preferably is of copper and is sufficiently massive to conduct heat along its entire length. The tube 23 has an inlet pipe 24 through which steam under a high pressure, such as, for example, a pressure of around 100 pounds per square inch, is supplied to the tube 23. The steam supplied to the vulcanizing tube 23 by the inlet pipe 24 is sufficiently hot and is under a pressure sufficiently high to vulcanize the extruded jacket 10. The extruder 20 includes a core centering tube 30 (Fig. 2), and the jacket-forming die 22, which forms the compound into the jacket 10, positioned in a passage 34 formed through a tool-holder 36 mounted in an extruding head 38.

An adapter 40, fitting in a bore 42 formed in the extruding head and bolted to the extruding head, has a tapered bore 44 therein. The adapter also has a counterbore 46, an annular groove 48, and a passage 50 and a threaded socket 51 communicating with the groove 48. A pipe 52 leading from a supply of a lubricant is connected by a fitting 54 to the passage 50. A suitable lubricant is a molten metallic soap, such as zinc stearate. The skin-curing tube 21 has a bore 56 therein of slightly larger diameter than that of the die 22 so that it barely contacts the jacket 10, which swells somewhat after leaving the die.

The tube 21 is locked to the adapter 40 by a threaded bushing 58 engaging a head 60 formed on the tube 21. The head 60 fits in the counterbore 46, and is provided with a frustoconical end 61, which holds a pile of thin metal laminates 62—62, of generally frustoconical shape, in snug engagement between the tube 21 and a frustoconical end 69 of the counterbore 46. The laminates 62—62 have notches 63—63 (Figs. 3 and 4) in their outer edges to permit a flow of lubricant therepast, and also have shallow radial grooves 64—64 in the front faces thereof and annular recesses 65 and 66 at the opposite ends of the grooves 64—64. The grooves 64—64 and the recesses 65 and 66 should be sufficiently shallow to prevent the covering compound from entering them, but are large enough to permit the flow of the lubricant therethrough. The depth of the grooves 64—64 preferably should be about 0.004 inch. The head 60 is provided with longitudinal grooves 81—81 (Fig. 5) and annular recesses 83—83 at the opposite ends of the grooves 81—81 to permit the flow of lubricant to the laminates 62—62.

The lubricant flows from the passage 50 through the notches 63—63 and the grooves 64—64 to a slightly enlarged portion 67 of the passage formed by the tapered bore 44, the laminates 62—62 and a tapered portion 68 of the bore 56. The enlarged portion 67 is not much larger than the outer diameter of the jacketed cable advancing therethrough. The function of this enlarged portion is to provide a slight clearance which acts as a sump to permit the lubricant to surround and contact the entire surface of the jacket 10.

The left hand end of the skin-curing tube 21, as viewed in Fig. 2, fits slidably in a stuffing gland 70 mounted on the entrance end of the vulcanizing tube 23. A gas burner ring 72 having apertures 74—74 directed angularly toward the skin-curing tube 21 is supplied with a combustible gas, and directs jets of flames on the skin-curing tube. A tubular shield 76, which is secured to the tube 21 by means of a ring 77, has a tapered entrance portion 78 for guiding the flames onto the skin-curing tube. The shield 76 is provided with a flared outlet 79 for the hot products of combustion from the gas flames.

*Operation*

The cable core 11 is advanced continuously through the extruder 20, the enlarged portion 67 of the passage, the skin-curing tube 21 and the vulcanizing tube 22. The extruder continuously forms the jacket 10 of unvulcanized, vulcanizable compound around the core, and the lubricant in the enlarged portion 67 covers the outer surface of the jacket to lubricate it in its passage through the skin-curing tube. The frustoconical laminates 62—62 are directed generally in the direction of advancement of the cable so that movement of the cable tends to draw the compound away from the recessed portions 65—65. The flame from the gas burner ring 72 is directed onto the tube 21 by the shield 76, and heats the tube 21 to a temperature sufficiently high to vulcanize the outer portion of the jacket 10 without charring the jacket 10. The skin-curing tube vulcanizes the outer portion of the jacket 10 to form a tough, abrasion-resistant skin thereon, which prevents damage to the covering as the covering is forced against the bottom of the elongated vulcanizing tube by sag of the core 10 in the tube. The high pressure steam supplied to the vulcanizing tube vulcanizes the remaining unvulcanized inner portions of the covering as it is advanced through the vulcanizing tube.

It will be noted that the laminates 62—62 are directed generally in the direction of advancement of the core so that movement of the cable tends to draw the plastic compound and the lubricant out of the grooves and recesses in the laminates rather than to force the plastic compound into them. Also, the lubricant is forced through the grooves and recesses under considerable pressure. In consequence, the lubricant develops a high velocity head which tends to prevent the plastic compound from being forced back into the grooves and recesses. As a result of both of these actions, the passages formed by the grooves 64—64 and the adjacent surfaces are kept clear, and the lubricant flows freely through the grooves and recesses and around the cable at all times.

By the use of the above-described method and apparatus initially only the outer portion of the jacket 10 vulcanizes to form the tough skin thereon. This tough skin is not damaged by contact with the bottom of the vulcanizing tube and does not slow the vulcanization process, inasmuch as the major portion of the covering is vulcanized by the action of the steam in the vulcanizing tube. The lubricator prevents sticking between the covering 10 and the skin-curing tube. The lubricator is simple in the construction thereof, and is efficient in its operation.

The above-described apparatus may be used without the vulcanizing tube to form extruded thermoplastic articles. When so used, the skin-curing tube smooths out any irregularities in the surfaces of the extruded articles, and the lubricator prevents charring and sticking of that surface.

Certain features of the above-described apparatus are disclosed and claimed in copending application Serial No. 199,466, filed December 6, 1950, by A. N. Gray and V. A. Rayburn for "Methods of and Apparatus for Continuously Making Vulcanized Articles."

What is claimed is:

1. An apparatus for making plastic articles, which comprises an extruding head having a passage therethrough, an adapter secured to the extruding head and having a bore aligned with the passage and an abutment at the end thereof nearer the passage, a plurality of nested plates mounted in the bore with the innermost one against the abutment, said plates having notched outer edges, annular passages at the edges thereof and generally radial passages connecting the annular passages, a tube extending into the adapter and pressing the plates toward the abutment, and means for forcing a lubricant through the passages in the plates into the tube.

2. An apparatus for making plastic articles, which comprises an extruding head having a passage therethrough, an adapter secured to the extruding head and having a bore aligned with the passage and a counterbore directed away from the passage, a plurality of nested, frustoconical annular plates mounted in the counterbore adjacent to the bottom thereof in positions directed away from said bottom, said plates having notched outer edges, annular passages at the edges thereof and radial passages connecting the annular passages, a tube extending into the counterbore in the adapter against the nested plates, means for pressing the tube against the nested plates, and means for forcing a lubricant through the passages in the plates into the tube.

3. An apparatus for making vulcanized articles, which comprises an extruding head having a passage therethrough and a socket formed at one end of the passage, an axially bored adapter mounted in the socket and having an abutment at the end thereof nearer the socket, a plurality of nested, frustoconical, annular plates mounted in the bore with the innermost one against the abutment, said plates having notched outer edges, annular passages at the edges thereof and radial passages connecting the annular passages, a skin-curing tube having one end adjacent to the nested plates, means for pressing the skin-curing tube against the nested plates, the passages in the adapter and the skin-curing tube having enlarged portions adjacent to the plates which together with the annular passages at the edges of the plates form a sump, and means for forcing a lubricant through the passages in the plates into the thus-formed sump.

4. In an apparatus for making insulated conductors including an extruding head through which such a conductor is advanced, an improved lubricating assembly for applying a lubricant to the surface of an advancing conductor, which comprises an adapter secured to the extruding head, said adapter having a bore to permit passage of the conductor and a counterbore having a frustoconical bottom near and directed away from the exit end of the extruding head passage, a plurality of annular plates mounted in the counterbore, said plates having a shape conforming to that of the frustoconical bottom of the counterbore and being positioned adjacent to said bottom, a tube extending into the adapter and having an enlarged head the end surface of which conforms with the shape of said plates, said enlarged head having longitudinal slots formed in the periphery thereof, a pressure nut threaded into the adapter to force the head against the plates, said nut being shaped so as to form an annular channel with the adjacent portion of the adapter, and means for introducing a lubricant into said annular channel whereby the lubricant will flow through the grooves in the head, through the passages in the plates and into the interior of the tube so as to apply the lubricant to the surface of an insulated conductor advancing through the tube.

References Cited in the file of this patent

UNITED STATES PATENTS

| Number | Name | Date |
|---|---|---|
| 1,370,800 | Egerton | Mar. 8, 1921 |
| 2,069,087 | Forstrom et al. | Jan. 26, 1937 |
| 2,291,344 | Powell | July 28, 1942 |
| 2,307,034 | Gaenzle | Jan. 5, 1943 |
| 2,519,375 | Jargstorff et al. | Aug. 22, 1950 |

FOREIGN PATENTS

| Number | Country | Date |
|---|---|---|
| 3,917 | Great Britain | of 1895 |